June 16, 1942.  W. J. WILEY  2,286,885
MACHINE FOR FORMING ELEMENTS
Filed Jan. 20, 1940  4 Sheets-Sheet 2

INVENTOR.
WILLIAM J. WILEY
BY
ATTORNEYS

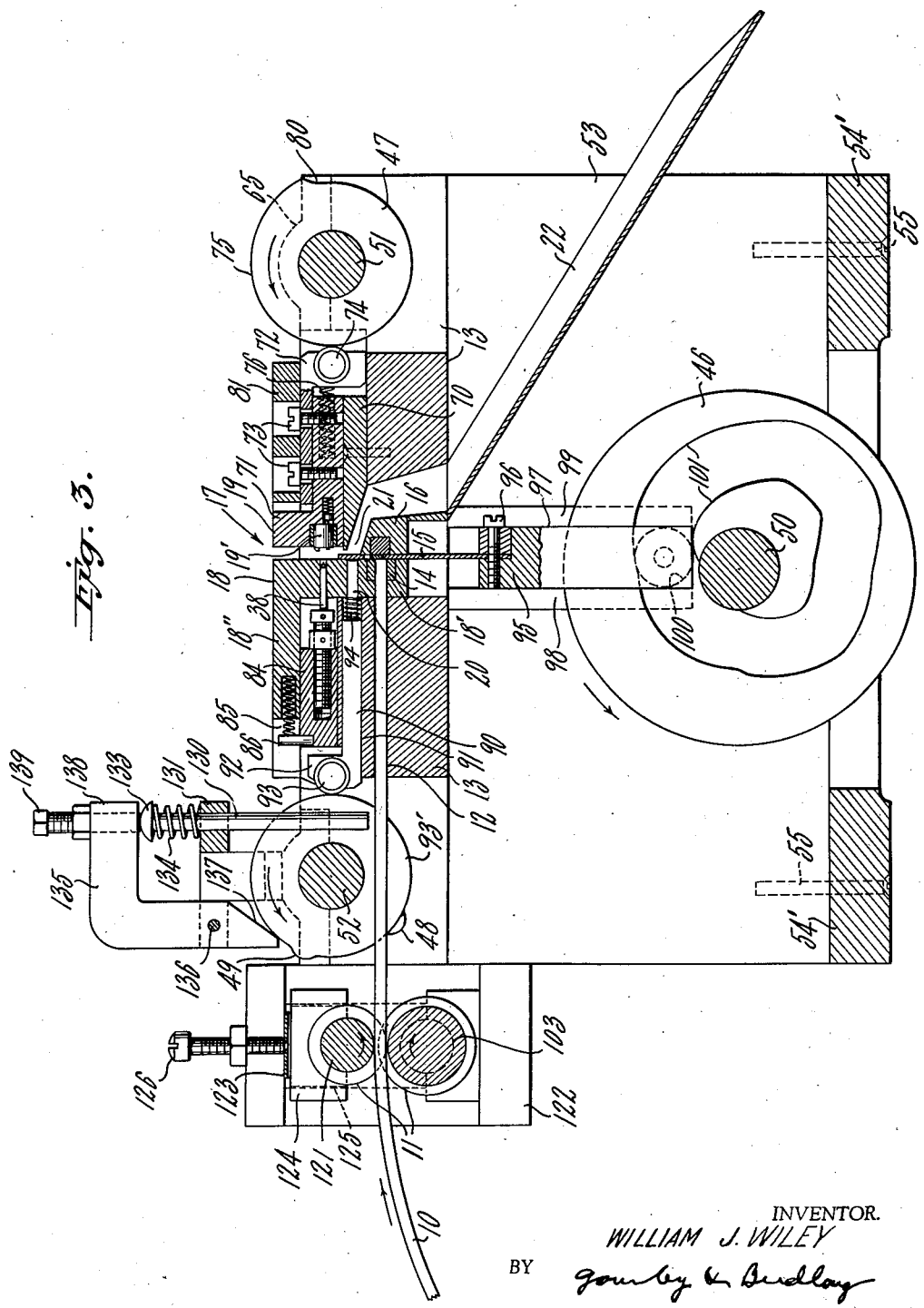

June 16, 1942.  W. J. WILEY  2,286,885
MACHINE FOR FORMING ELEMENTS
Filed Jan. 20, 1940  4 Sheets-Sheet 4
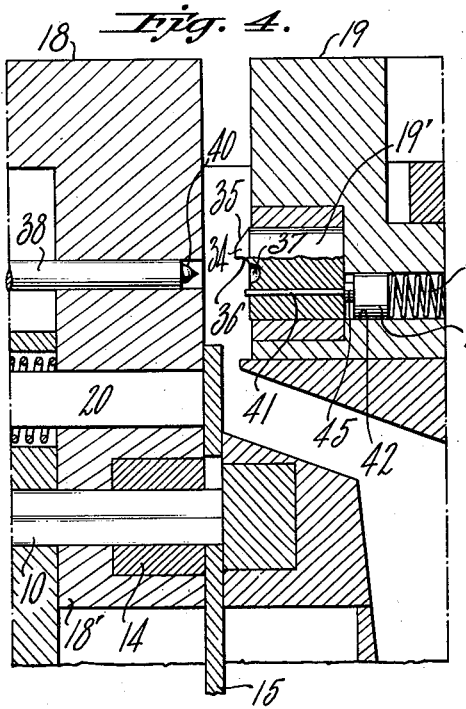
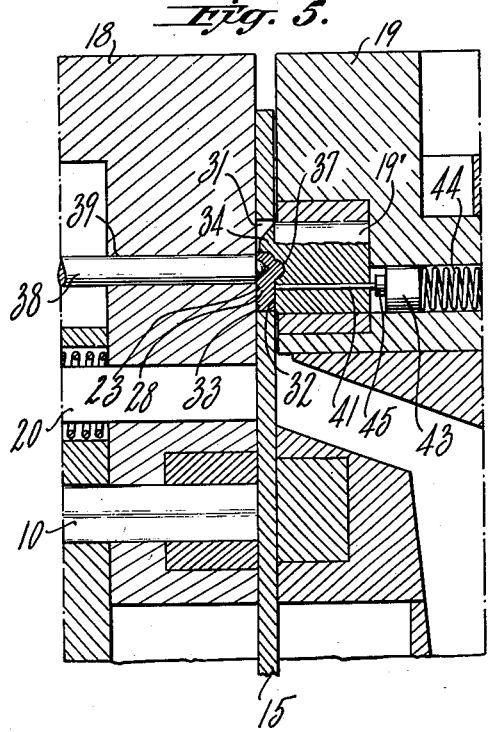
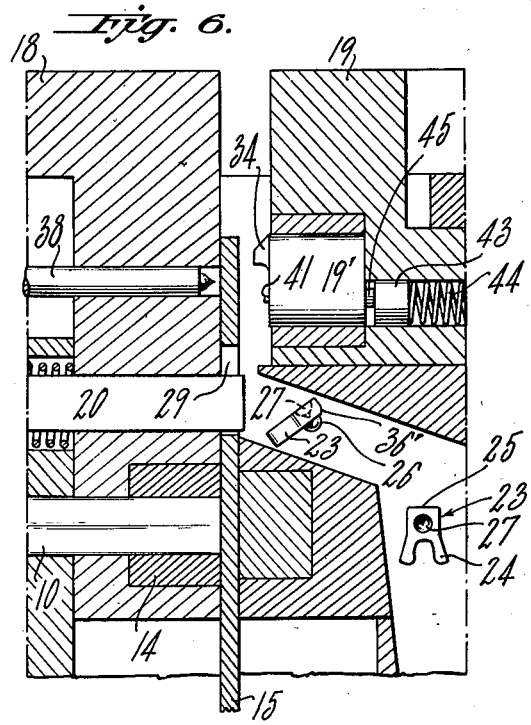
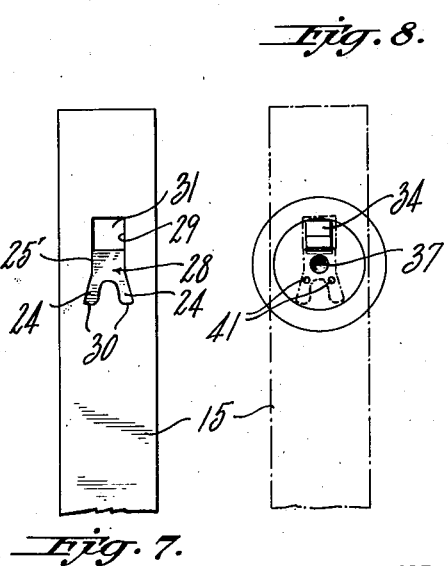
INVENTOR.
WILLIAM J. WILEY
BY
ATTORNEYS Patented June 16, 1942

2,286,885

UNITED STATES PATENT OFFICE 2,286,885

MACHINE FOR FORMING ELEMENTS

William J. Wiley, Waterbury, Conn., assignor to United States Rubber Company, New York, N. Y., a corporation of New Jersey Application January 20, 1940, Serial No. 314,823

6 Claims. (Cl. 29—34)

This invention relates to a machine for forming metal elements particularly for forming such elements as are used in separable fasteners.

This invention is an improvement upon and is related to United States Patent No. 2,183,373 and United States patent application, Serial No. 203,742, filed April 23, 1938. The improvement in this application relates particularly to means for preventing the element blanks and the elements formed therefrom from sticking in the swedging die and for straightening the elongated metal shape from which the element blanks are cut before they enter the cutting die. In the present machine the end of an elongated metal shape is extended through a cutting die and into an opening in a reciprocating knife. As the knife is reciprocated the end of the metal shape is sheared off to form an element blank. The blank is securely held in the opening in the knife which acts as a carrier therefor while it is carried from the cutting die to a swedging die, of which the knife forms a part, and then to a station where the element blank is positively ejected therefrom. Since the element blank and the element formed therefrom is positively carried by the knife into and out of the swedging die, and the finished element is positively ejected from the knife, or carrier, the danger of the element becoming jammed in the die is practically eliminated.

The above objects and other features of this invention will be more clearly understood by referring to the following description and the accompanying drawings, in which:

Fig. 3 is a cross-sectional view taken on line 3—3 of Fig. 1;

Figs. 4, 5 and 6 are partly cross-sectional and elevational views of the cutting and swedging dies respectively showing the die parts in their relative positions when the end of the metal shape is sheared off to form an element blank, when the element blank is being shaped, and when the finished element is being discharged from the knife;

Fig. 7 is an elevational view of the knife or carrier with an element blank in the cutting opening formed therein; and Fig. 8 is a front end view of one face of the swedging die showing the cutting knife and swedged element in dot and dash lines and in the positions they occupy while the element is being swedged.

Figure 1:
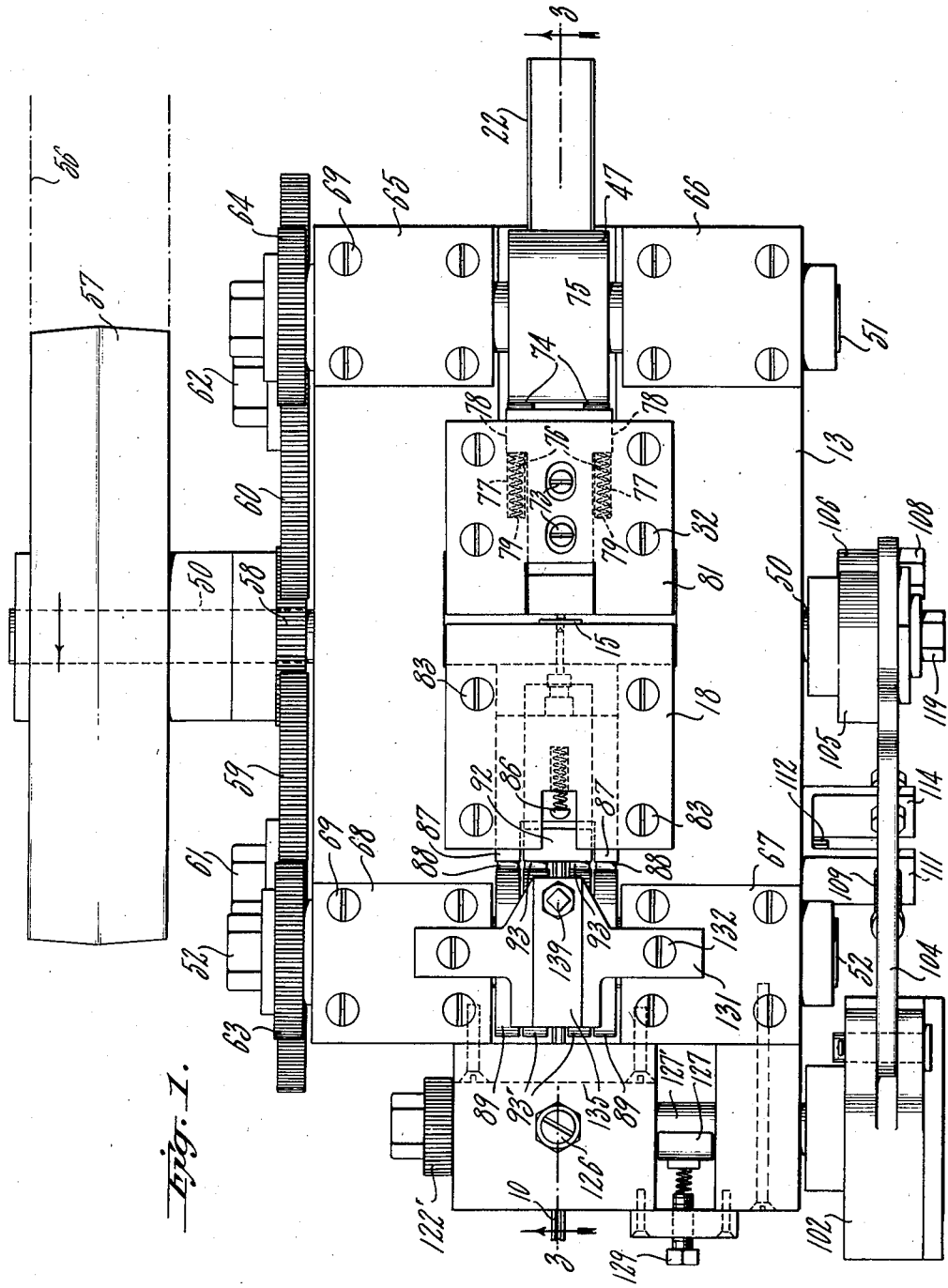
Fig. 1 is a plan view of a machine embodying this invention.

Referring to the drawings, particularly to Fig. 3, an elongated metal shape 10 is fed by feed rolls 11 through a guideway 12 formed in a guide block 13 which forms a support for the machine parts. The end of the shape is projected through a cutting die 14 and an opening in the cutting knife 15 until it is stopped by an abutment 16. The knife 15 is reciprocated back and forth between the cutting die 14 and a swedging die 17. As the knife 15 moves upwardly the end of the metal shape 10 is sheared off to form an element blank which is securely held in the opening in the knife 15 and against movement in both directions of reciprocation. The element is carried in the opening by the knife 15 to the swedging die 17, of which the opening in the knife 15 forms a part. The element blank is swedged in the die cavity formed by walls of the opening in the knife 15 and the adjacent faces of a reciprocating member 19 and an abutment 18. After the element blank has been shaped to form the element, the carrier 15 is moved downwardly until the opening therein is opposite an ejector 20 which moves forward and ejects the element into the discharge passage 21. The elements then fall by gravity down the chute 22 where they are collected for use, or for further treatment, such as polishing, plating and painting.

The machine disclosed herein is particularly designed for making fastener elements 23 of the shape shown in Fig. 6 which are being discharged from the machine. The top element 23 just being discharged is shown in side elevation, and the bottom element 23 is shown in front elevation. The elements have generally a Y-shape, the branches of the Y forming the jaws 24 of the element and the stem of the Y forming the head 25 of the element. A locking projection 26 is provided on one side of the head and a locking recess 27 is provided on the other side.

The elements 23 are made from the element blank 28, shown in Fig. 7, and which is cut from the end of the elongated metal shape 10 having a similar cross-sectional shape. The knife 15 is provided with an opening 29 of Y-shape having branches 30 adapted to closely fit the portions of the shape 10 which form the jaws 24 of the element, and the stem of the Y-opening 29 extends beyond the head 25' of the element blank so as to form a space 31 into which a projection, hereinafter to be described, is adapted to extend to shape the end of the head 25'.

As shown in Fig. 4 the end of the metal shape 10 has been moved through the cutting die 14 having an opening conforming to the cross-sectional shape of the metal shape 10 and into the opening 29 in the knife 15. As the knife 15 is moved upwardly the end of the shape 10 is sheared off, and it is retained in the opening as shown in Fig. 7. The knife is then moved upwardly to the position shown in Fig. 5, but while the reciprocating part 19 of the swedging die is in the position as shown in Fig. 4, excepting that it moves towards the knife 15 at the end of the knife's stroke. The reciprocating part 19 is provided with a hardened metal insert 19' having a face 32 which is then moved to the left against the face of the element blank 28, as shown in Fig. 5, so as to enclose the blank within the opening 29 and between the face 32 of the insert 19' and the face 33 of the stationary abutment 18. A projection 34 extends from the face 32 of the insert 19' and into the space 31 above the head 25' of the element 28. Referring to Fig. 4, the projection 34 is provided with an inclined top surface 35 which makes it possible for the projection to move partly into the opening 31 before the knife 15 has reached the end of its upward stroke. The projection 34 acts as an abutment for the head 25' of the element blank 28 and is provided with a rounded bottom surface 36 which is adapted to form a correspondingly rounded surface upon the end of the element head 25.

The face 32 of the insert 19' is provided with a rounded recess 37 into which the metal of the element blank 28 is forced by a reciprocating punch 38 which operates in a guideway 39 in the abutment 18. The punch 38 is provided with a rounded end 40 which occupies the position shown in Fig. 4 when the blank 28 is moved to the Fig. 5 position. The end 40 is then reciprocated against the element blank 28 to form the locking recess 27 in the element 23 and to force the metal into the recess 37 to form the projection 26 on the finished element.

After the element has been shaped, as shown in Fig. 5, the reciprocating member 19 is moved away from the knife 15, and the element 23 is separated, or ejected from the face 32 of the insert 19' by a pair of ejector pins 41 (Figs. 5 and 8) operating in bores opening into the face 32. When the reciprocating member 19 is in the position shown in Fig. 5 the ends of the pins 41 are resiliently pressed against the blank 28 by mechanism enclosed in a bore 42 in the member 19. The mechanism comprises an abutment 43 operated by a spring 44 which forces the abutment against the heads 45 of the pins 41 and causes the forward ends of the pins 41 to project through the face 32 against the element blank 28. As the reciprocating member 19 moves away from the knife 15, the ends of the pins 41 are projected beyond the face 32 and eject the element 23 from the face and causes it to remain in the opening 29 in the knife 15. The end 40 of the punch 20 is then or simultaneously with the movement of the member 19 moved within the face 33 of the abutment 18.

The knife 15 is now moved downwardly and stopped at the ejecting position as shown in Fig. 6. The end of the ejector 20 is moved forward through the opening 29 in the knife 15 and discharges the finished element 23 therefrom, while the knife is held stationary. The ejector 20 is then withdrawn into the abutment 18, and the opening 29 is then moved opposite the opening in the cutting die 14 where it is ready to receive the end of the metal shape 10 for forming the next succeeding element blank 28.

Referring to Fig. 3, the knife 15, the reciprocating member 19, the punch 38, and the ejector 20 are respectively operated by the cam wheels 46, 47 and the cam projections 48 and 49. The cam wheels 46, 47, and the cam projections 48 and 49 are respectively keyed to shafts 50, 51 and 52, which are journaled in side plates 53 and 54 (Figs. 2 and 3), which plates are secured together by the top guide and supporting block 13 and the bottom plate 54', to which the side plates are secured by screws 55. The shafts 50, 51 and 52 are driven from a prime mover, such as a belt 56 (Fig. 1), which drives a pulley 57 keyed to the shaft 50. A gear 58 is keyed to the shaft 50. Idler gears 59 and 60 are mounted upon stub shafts 61 and 62 fixed to the side plate 53 of the machine. The gears 59 and 60 mesh with the gear 58 and drive gears 63 and 64 keyed respectively to the shafts 52 and 51 upon which cam projections 48 and 49, and the cam wheel 47 are respectively mounted. The shafts 51 and 52 are held in their bearings by the bearing cap plates 65, 66, and 67, 68 which are secured to the guide and supporting block 13 by screws 69.

Referring to Fig. 3, the reciprocating member 19 is slidably supported on a plate 70 secured to the guide and supporting block 13. The reciprocating member 19 is made in two parts, 71 and 72, which are secured together by screws 73. The part 72 has rollers 74 rotatably mounted thereon which are held against the cam surface 75 of the cam wheel 47 by springs 76 located in recesses 77 (Fig. 1), formed between wings 78 on the part 72 and shoulders 79 on the block 13. As shown in Fig. 3, the cam surface 75 is rotated in the direction of the arrow, and the face of the insert 19', carried by the reciprocating member 19 is moved towards the face of the abutment 18. When the face of the insert comes in contact with the face of the knife 15, the reciprocating member 19 remains stationary until the depression 80 in the cam surface 75 contacts with the rollers 74. Then the rollers 74 ride down the depression 80 and the springs 76 move the face of the insert 19' away from the face of the knife 15. The member 19 is thus reciprocated within a guideway formed between the plate 70 and the sides of a recess formed in the guide block 13. The reciprocating member 19 is held in the guideway by a plate 81 which is secured to the guide and supporting block 13 by screws 82.

Referring to Figs. 1 and 3, the abutment 18 is secured to the guide and supporting block 13 by screws 83. The abutment 18 is L-shaped. The leg 18' of the abutment retains the cutting die 14, and is provided with bores for receiving the ejector 20 and the punch 38. The punch 38 is screw threaded into a slide block 84 which is adapted to reciprocate in a recess formed between the leg 18" of the abutment 18 and the guide block 13. One end of a spring 85 is located in a recess formed in the leg 18" and the other end of the spring abuts against a post 86 secured to the slide block 84. On each side of the post 86 the slide block 84 is provided with branches 87 (Fig. 1) on which are journaled rollers 88, which are held by the spring 85 against the cam surfaces 89 from which the cam projections 48 extend. As these surfaces 89 rotate in the direction of the arrow, shown in Fig. 3, the projections 48 contact with the rollers 88 and force the punch through the face of the abutment 18 to form the locking projection 26, (Fig. 6) and locking recess 27 on the element 23.

Referring to Fig. 3, the ejector 20 is connected to a slide block 90 which reciprocates in a guideway 91 formed in the guide and supporting block 13. The slide block 90 has a projection 92 which extends upwardly between the branches 87 of the punch slide block 84, and is provided with rollers 93 which are held against cam surfaces 93' by a spring 94 which encircles the end of the ejector 20 and is compressed between the leg 18' of the abutment 18 and a shoulder on the slide block 90. As the cam surfaces 93', from which the cam projections 49 extend, are rotated in the direction of the arrow, the cam projections 49 contact with the rollers 93 and project the ejector 20 through the opening 29 in the knife 15 to eject the finished elements 23.

The knife 15 is mounted in a slide block 95 and retained therein by a screw 96. The slide block 95 is adapted to reciprocate in the guideway 97 formed between guide members 98 and 99 secured to the side plates 53 and 54. A roller 100 is journaled on the end of the slide block 95 and operates within a cam groove 101 formed in the cam wheel 46 which is keyed to the shaft 50. As the cam wheel is rotated in the direction of the arrow, the knife 15 is moved upwardly from the cutting die 14 to the swedging die 17, where the element blank 28 is held in a stationary position until it is swedged in the die, and is then moved downwardly to the ejector 20, where it remains in a stationary position until the ejector 20 ejects the element therefrom. The knife is then returned to the cutting die position. The cam groove 101 is so formed that it causes the knife to reciprocate in the above manner.

The feed rolls 11 are rotated intermittently in the direction of the arrow shown in Fig. 3, by a well known type of roller ratchet mechanism 102 (Fig. 2), which is operatively connected to the shaft 103 upon which the lower roll 11 is mounted. The mechanism 102 is oscillated about the shaft 103 by a rod 104 pivoted at one end to the ratchet mechanism 102. The opposite end of the rod 104 is operated by a cam 105 fixed to the shaft 50. A roller 106 is journaled on a stud shaft 107 which is secured to the end of the rod 104 by a nut 108. The cam 105 actuates the roller 106 in opposition to a spring 109 which is compressed between a projection 110 secured to the rod 104 and an abutment 111 which is secured to the side plate 54 of the machine by a bolt 112. A set screw 113 is screw threaded into a projection 114 on the abutment 111, and is adapted to contact with a shoulder 114' on the end of the rod 104 and to be adjusted so as to limit the arc of oscillation of the ratchet mechanism 102. The end of the rod 104 is provided with a rectangular opening 115 which fits over the end of the shaft 50 and is retained thereon and permitted to slide in reference thereto by a block 116, which is provided with a rectangular portion 117 which extends into the opening 115, and is provided with a bore which extends over the shaft 50. The block 116 is provided with flanges 118 which overlap the outer surfaces of the end of the rod 104. The block 116 is retained on the shaft 50 by a nut 119 and a washer 120.

Referring to Fig. 3, the shafts 103 and 121 of the feed rolls 11 are mounted in a frame 122 which is secured to the feed end of the machine. The feed rolls 11 are resiliently pressed together by a leaf spring 123 which bears upon a block 124 which in turn bears upon the shaft 121 and is movable up and down in guides 125 formed in the frame 122. The pressure of the spring 123 against the block 124 may be adjusted by a set screw 126.

Figure 2:
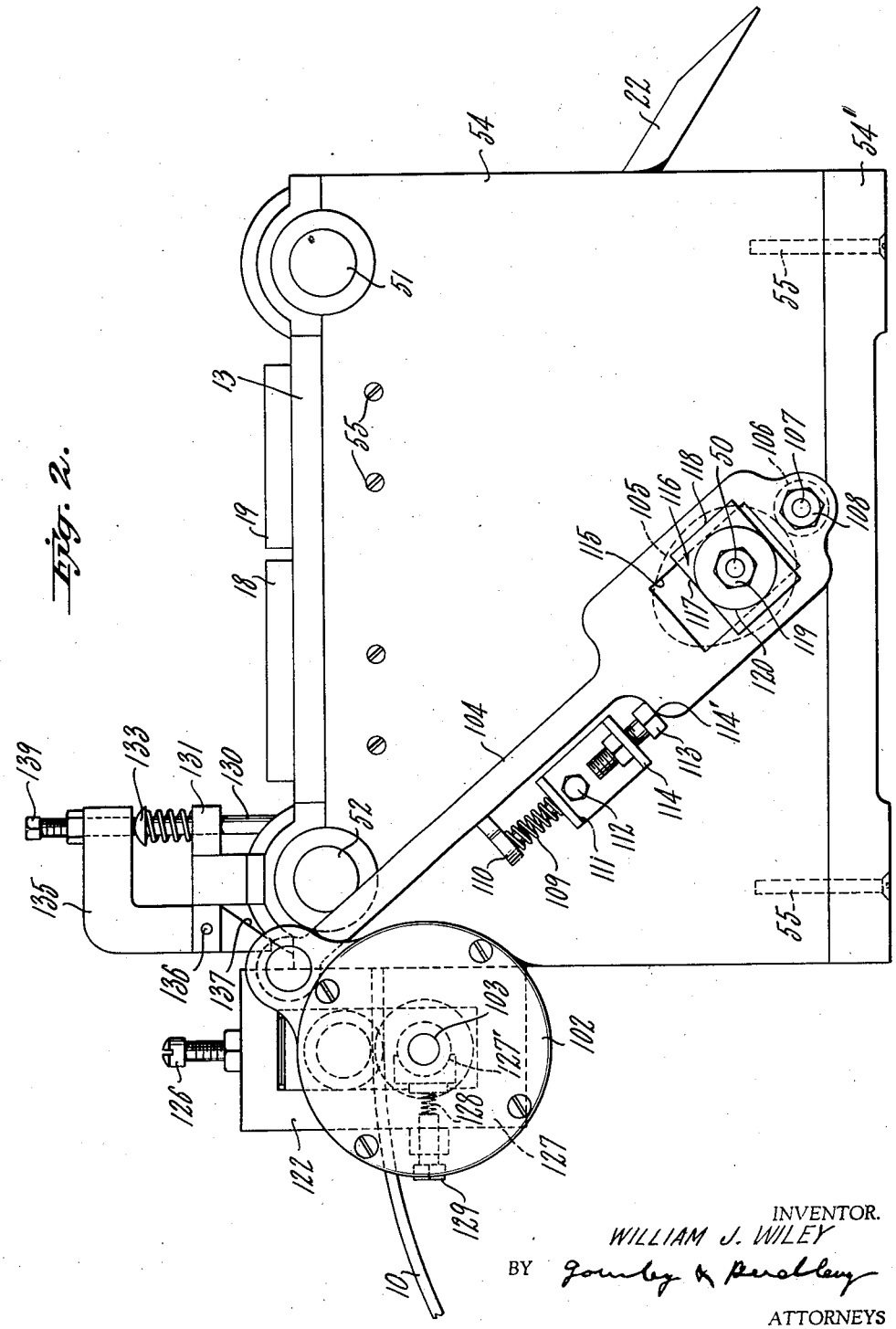
Fig. 2 is a side elevational view thereof.

Referring to Figs. 1 and 2, a brake comprising a brake shoe 127 is provided to prevent the frictional resistance in the ratchet mechanism 102 from moving the metal shape 10 out of the machine and away from the cutting die. The shoe 127 is resiliently pressed against a drum 127' on the shaft 103 by a spring 128. The force exerted by the spring 128 on the shoe 127 can be adjusted by a set screw 129.

The metal shape 10 is led from a reel (not shown) to the feed rolls 11 and is therefore curved lengthwise when it reaches the feed rolls. In order to take this curvature out of the metal shape 10, a reciprocating plunger 130 (Figs. 2 and 3) is mounted in a bracket 131 and its end is adapted to strike the top of the metal shape 10 between the feed rolls 11 and the entrance to the guideway 12 for the shape 10 in the block 13. As shown in Fig. 1, the bracket 131 is mounted upon the bearing caps 67 and 68 by screws 132 and extends therebetween. The plunger 130 is provided with a head 133 which is urged upwardly by a spring 134 compressed between the head 133 and the bracket 131. An L-shaped lever 135 is pivotally mounted on a pin 136 secured in the bracket 131. The lower end of the lever 135 is provided with a downwardly inclined surface 137 which is adapted to ride upon the cam projections 49 extending from the cam surfaces 93'. As the inclined surface 137 rides over the projections 49 the upper end 138 of the lever 135 is pivoted downwardly upon the head 133 of the plunger 130 and causes its lower end to hammer against the metal shape and thereby straighten it. The stroke of the plunger may be slightly adjusted by a set screw 139 threaded in the lever 135, and whose lower end contacts with the head 133 of the plunger 130.

While this invention has been described in detail, it will be understood that changes may be made in the present disclosure, without departing from the spirit of the invention, and it is desired to claim the invention as broadly as permitted by the prior art and to the extent covered by the scope of the appended claims.

Having thus described my invention, what I claim and desire to protect by Letters Patent:

1. A machine comprising a die for swedging elements, said die comprising a reciprocable member having a face adapted to contact with and shape an element, an abutment having a face adapted to receive the thrust of said member, a carrier for an element blank and the element formed therefrom, said carrier having a recess therein for holding the element blank, said recess being adapted to be reciprocated between the faces of said reciprocable member and abutment to form a die cavity for the blank, said die cavity being enclosed by the walls of the reciprocable member and abutment and the walls of the recess in said carrier when such members are in cooperative engagement, said recess in said carrier being so shaped that the element is securely held against movement therein in both directions of the reciprocating movement of said carrier, means for reciprocating said carrier and said reciprocable member so as to move the recess in said carrier between said abutment and said reciprocable member and the face of said reciprocable member into and out of contact with the face of said carrier to close and open said die cavity and then move said recess in said carrier from between said faces of said abutment and reciprocable member, and means for ejecting the element from said carrier recess while it is out of the space between said reciprocating member and the abutment.

2. A machine comprising a die for swedging elements, said die comprising a reciprocable member having a face adapted to contact with and shape an element, an abutment having a face adapted to receive the thrust of said member, a carrier for an element blank and the element formed therefrom, said carrier having a recess therein for holding the element blank, said recess being adapted to be reciprocated between the faces of said reciprocable member and abutment to form a die cavity for the blank, said die cavity being enclosed by the walls of the reciprocable member and abutment and the walls of the recess in said carrier when such members are in cooperative engagement, said recess in said carrier being so shaped that the element is securely held against movement therein in both directions of the reciprocating movement of said carrier, said reciprocating member having a spring actuated ejector adapted to extend from the face of said reciprocating member and eject the element from said face when it recedes from said abutment, means for reciprocating said carrier and said reciprocable member so as to move the recess in said carrier between said abutment and said reciprocable member and the face of said reciprocable member into and out of contact with the face of said carrier to close and open said die cavity and then move said recess in said carrier from between said faces of said abutment and reciprocable member, and means for ejecting the element from said carrier recess while it is out of the space between said reciprocating member and the abutment.

3. A machine comprising a die for swedging separable fastener elements, said die comprising a reciprocable member having a face adapted to contact with and shape an element, an abutment having a face adapted to receive the thrust of said member, a carrier for an element blank and the element formed therefrom, said carrier having a recess therein for holding the element blank, said recess being adapted to be reciprocated between the faces of said reciprocable member and abutment to form a die cavity for the blank, said die cavity being enclosed by the walls of the reciprocable member and abutment and the walls of the recess in said carrier when such members are in cooperative engagement, said recess in said carrier being so shaped that the element is securely held against movement therein in both directions of the reciprocating movement of said carrier, said abutment having a guide way formed therein, a punch operating therein and adapted to extend through the face thereof, the face of said reciprocable member having a recess formed therein in alignment with said punch, means for reciprocating said carrier and said reciprocable member so as to move the recess in said carrier between said abutment and said reciprocable member and the face of said reciprocable member into contact with the face of said carrier to form said die cavity with the element blank enclosed therein, means for moving the end of said punch against the element blank so as to form a locking recess on one side of the element head and a locking projection on the other side by forcing the metal of said element head into the recess in the face of said reciprocating member and then moving the end of said punch within said abutment, means for moving the face of said reciprocable member away from said carrier, means for moving said recess in said carrier from between said faces of said abutment and reciprocable member, and means for ejecting the element from said carrier recess while it is out of the space between said reciprocating member and the abutment.

4. A machine comprising a die for swedging separable fastener elements each having jaws and a head extending from the junction of same, said die comprising a reciprocable member having a face adapted to contact with and shape an element, an abutment having a face adapted to receive the thrust of said member, a carrier for an element blank and the element formed therefrom, said carrier having a recess therein for holding the element blank, said recess being adapted to be reciprocated between the faces of said reciprocable member and abutment to form a die cavity for the blank, said die cavity being enclosed by the walls of the reciprocable member and abutment and the walls of the recess in said carrier when such members are in cooperative engagement, said recess in said carriage having a Y shape, the branches of the Y being adapted to closely fit the jaws of the element blank, the stem of the Y being adapted to receive the head of the element blank and extended beyond the end of the head, a projection extending from the face of said reciprocating member and adapted to extend into the portion of the stem of the Y beyond the head of the element to shape the end of said head, means for reciprocating said carrier and said reciprocable member so as to move the recess in said carrier between said abutment and said reciprocable member and the face of said reciprocable member into and out of contact with the face of said carrier to close and open said die cavity and then move said recess in said carrier from between said faces of said abutment and reciprocable member, and means for ejecting the element from said carrier recess while it is out of the space between said reciprocating member and the abutment.

5. A machine comprising a die for swedging separable fastener elements each having jaws and a head extending from the junction of same, said die comprising a reciprocable member having a face adapted to contact with and shape an element, an abutment having a face adapted to receive the thrust of said member, a carrier for an element blank and the element formed therefrom, said carrier having a Y shaped opening therein for holding the element blank with the jaws in the branches of the Y and the head in the stem of the Y, said stem extending beyond the head of the blank, said opening being adapted to be reciprocated between the faces of said reciprocable member and abutment to form a die cavity for the blank which is enclosed by said faces of the reciprocable member and abutment and the walls of the opening in said carrier when such members are in cooperative engagement, said face of said reciprocating member having a projection adapted to extend into the portion of the stem of the Y beyond the head of the element blank and adapted to round the end of the head on the side adjacent to the face of said reciprocating member, said abutment having a guide way formed therein, a punch operating therein and adapted to extend through the face thereof, the face of said reciprocable member having a recess formed therein in alignment with said punch, means for reciprocating said carrier and said reciprocable member so as to move the opening in said carrier between said abutment and said reciprocable member and the face of said reciprocable member into contact with the face of said carrier to form said die cavity with the element enclosed therein, means for reciprocating the end of said punch against the element blank so as to form a locking recess on one side of the element head and a locking projection on the other side, means for moving the face of said reciprocable member away from the face of said abutment, means adapted to extend from the face of said reciprocable member to eject the element therefrom, means for moving said opening in said carrier from between said faces of said abutment and reciprocable member and means for ejecting the element from said carrier while the opening is out of the space between said reciprocating member and the abutment.

6. A machine for forming fastener elements comprising an element cutting die and an element shaping die, means for feeding to said cutting die a curved length of wire having a cross sectional shape generally the shape of the element to be formed, means for suspending said wire between said feeding means and cutting die, means for straightening said wire where suspended, comprising a reciprocable hammer which is adapted to strike the wire on the side opposite to its center of curvature, said cutting die comprising a shearing block and a reciprocating shearing knife, each having an opening therein, an abutment on the opposite side of said knife from said block, said wire being fed through said opening in said shearing block and into said opening in said knife until stopped by said abutment, means for operating said knife to shear off the end of the wire to form a blank in said opening in said knife and to carry said blank to said shaping die.

WILLIAM J. WILEY.